(No Model.)
W. M. MIXER.
ABSORBER.
No. 600,159. Patented Mar. 8, 1898.
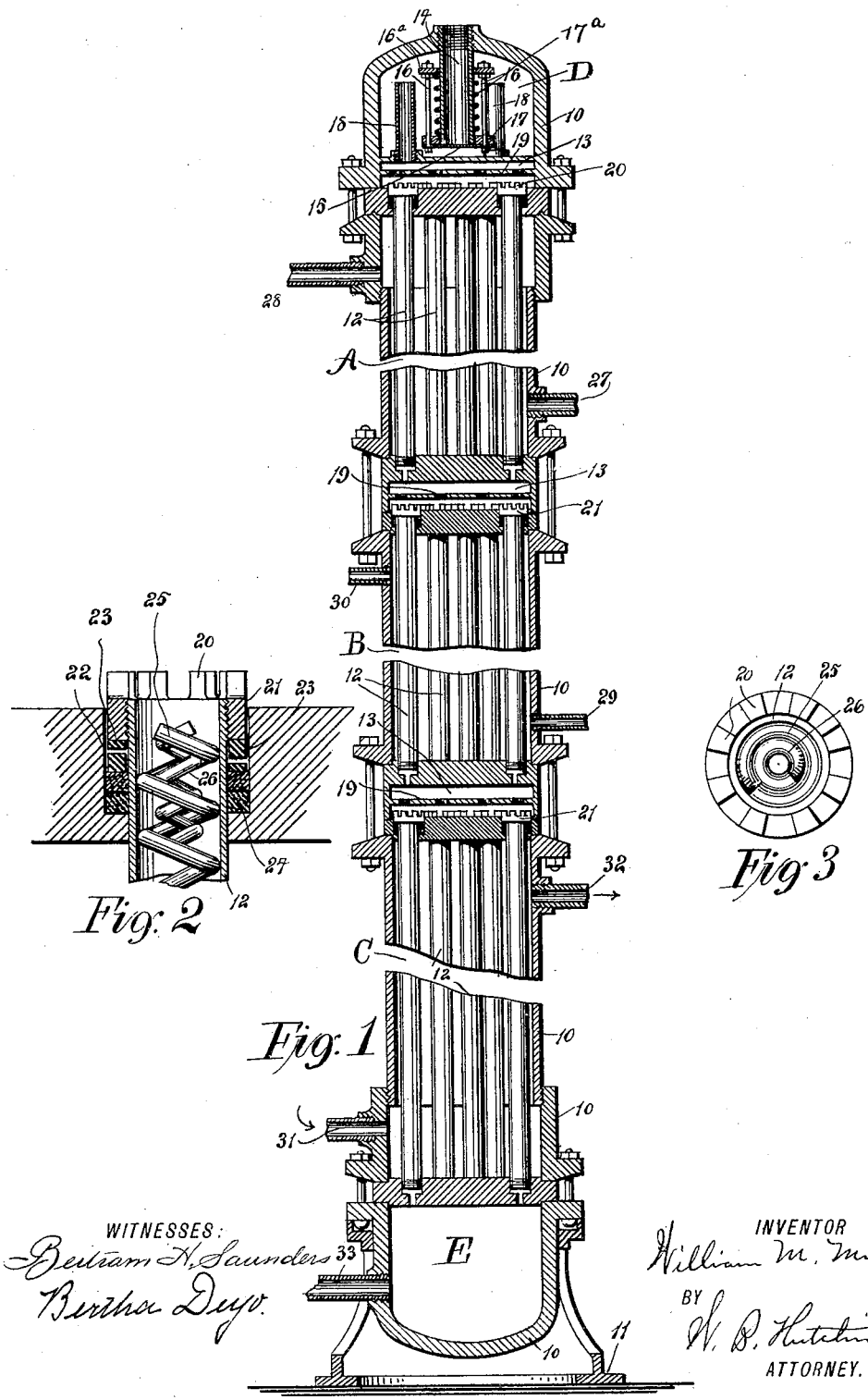
WITNESSES:
Bertram H. Saunders
Bertha Deyo
INVENTOR
William M. Mixer,
BY W. P. Hutchinson,
ATTORNEY.

UNITED STATES PATENT OFFICE.

WILLIAM M. MIXER, OF NEW YORK, N. Y., ASSIGNOR TO WARREN B. HUTCHINSON, TRUSTEE, OF SAME PLACE.

ABSORBER.

SPECIFICATION forming part of Letters Patent No. 600,159, dated March 8, 1898.

Application filed September 26, 1896. Serial No. 607,035. (No model.)

*To all whom it may concern:*

Be it known that I, WILLIAM M. MIXER, of New York, in the county and State of New York, have invented certain new and useful Improvements in Absorbers, of which the following is a full, clear, and exact description.

My invention relates to improvements in absorbers, and particularly to apparatus of this class used in connection with ice-manufacturing machinery.

The object of my invention is to produce a comparatively simple apparatus which causes the gas and weak water introduced into the absorber to be thoroughly mingled and combined; to provide a convenient means for introducing cold aqua-ammonia, water, and cold gas into the several sections of the absorber to carry off the heat generated; to provide convenient means for preventing a too quick flow of gas and water through the absorber, to the end that the two may be perfectly mingled, and in general to produce an inexpensive and practical apparatus capable of doing a great deal of work and doing it well.

With these ends in view my invention consists of certain features of construction and combinations of parts, which will be hereinafter described and claimed.

Reference is to be had to the accompanying drawings, forming a part of this specification, in which similar figures and letters of reference indicate corresponding parts in all the views.

Figure 1 is a broken longitudinal sectional view of the absorber, showing my improvements. Fig. 2 is an enlarged detail view of one of the pipe-joints and retarding-springs, and Fig. 3 is a detail end view of one of the pipes and its internal coils and external deflecting or distributing collar.

The apparatus has a long body 10, of a generally cylindrical shape, which, as illustrated, is made up in several sections bolted together and resting on a base 11; but the means of connecting the parts is not specifically referred to, because the body of the absorber may be made in one or several pieces, as desired, and I make no claim to the exterior construction.

The absorber has, as illustrated, three main chambers A, B, and C, although it will be understood that the apparatus may have a greater or less number of chambers without affecting the principle of the invention, the number of such chambers depending upon the circumstances varying with the necessities of different plants. The absorber has also an inlet-chamber D at the top and an outlet-chamber E at the bottom, the former receiving the imperfectly-combined gas and weak water and the latter serving to collect the two when combined, in order that the same may be pumped out conveniently to the still used in connection with ice-making apparatus.

The several sections or chambers A, B, and C have distributing-chambers 13 above them, and these distributing-chambers are connected by pipes 12, which run through the several main chambers, the lower pipes connecting with the outlet-chamber E at the bottom of the absorber. The distributing-chambers will be more specifically referred to below.

The weak water and gas are delivered through suitable pipes to an inlet-pipe 14, which discharges into the receiving-chamber D, the inflow passing by the valve 15, which closes the bottom of the pipe 14 and which may be a check-valve of any suitable character, but which, as illustrated, is a plate having guide-rods 16 sliding through a collar 17 on the lower end of the pipe 14, the valve being kept closed by a spring 17ª, which coils around the pipe and lies between the collar 17 and a ring 16ª at the upper ends of the guide-rods. As the weak water and gas rise in the receiving-chamber D the overflow runs down through the pipes 18 to the upper distributing-chamber 13 and is distributed over the bottom of the said distributing-chamber by passing through the holes of the perforated deflector or baffle-plate 19, which traverses the distributing-chamber transversely, as the drawings show. From the upper distributing-chamber the partially-mingled gas and weak water passes downward through the upper series of pipes 12 to the second distributing-chamber, and in order that the liquid may be caused to run in equal proportions through all of the pipes the said pipes are provided at the top with distributing or deflecting collars 21, which have serrated upper edges 20 extending above the floor of the distributing-chamber 13, so that the liquid in the said chamber passes through the serrations and therefore cannot run down one pipe to the exclusion of the other pipes. The collar 21 on each pipe extends into a socket 22 in the floor of the chamber 13, as shown clearly in Fig. 2, and beneath the collar is a helical flat spring 23, the lower end of which impinges on suitable packing-rings 24. This packing arrangement is an important matter, as by it the pipe-joints are kept perfectly tight, and at the same time provision is made for the necessary contraction and expansion of the pipes, as the helical spring yields when the pipe contracts and expands with the expansion of the pipe, while pressure is constantly maintained on the packing-rings sufficient to keep the joint tight. The tension of the spring 23 can be regulated by screwing the collar 21 to a greater or less extent on the pipe 12. To further retard the downflow of liquid to the end that perfect mingling may be obtained, each pipe 12 is provided with double or concentric spiral coils 25 and 26, arranged one within the other, as shown clearly in Fig. 2. This arrangement of the coils 25 and 26 retards the downflow of the liquid and subdivides it to a great extent, the liquid dropping from coil to coil and from bend to bend, while a portion will also trickle along the wall of the pipe, and thus it is in condition to be very rapidly cooled.

The upper main chamber A of the absorber is usually made to receive a strong ammonia liquor, which enters through an inlet 27 near the bottom of the chamber and passes out through the outlet 28. The second main chamber B is preferably filled with cold water, which enters through an inlet 29 near the bottom and passes out through the outlet-pipe 30 near the top, and as this water will be heated by the pipes 12 it can be used to advantage to feed the boilers used in connection with the ice plant. If the third chamber C is used, it can be kept filled with the cold ammonia-gas, which enters through the inlet 31 near the bottom and passes out through the outlet 32 near the top. The gas and weak water entering through the inlet 14 to the chamber D will then pass by the valve 15, which prevents any backflow and overflowing into the pipe 18, will enter the first distributing-chamber 13, be distributed over the bottom of said chamber by the deflecting or baffle plate 19, being further distributed by the serrated collars 21, and pass down through the first series of pipes 12, the gas and water gradually mingling, the flow being distributed as above described and retarded by the coils in the pipes 12. The heat thrown off by the pipes will be absorbed by the strong liquor in the main chamber A. The above action is repeated in the second distributing-chamber and main chamber B, the heat thrown off being in this case absorbed by the water in the aforesaid chamber. The action is again repeated in the lower chamber C, in which case the radiated heat is absorbed by the cold gas in the chamber. Finally the perfectly-mingled gas and weak water collects in the chamber E and passes out through the pipe 33, being forced by a suitable pump back to the still, with which the ice plant is provided.

Having thus described my invention, I claim as new and desire to secure by Letters Patent—

1. An apparatus of the kind described, comprising a series of superposed main chambers, each having a suitable inlet and outlet for a circulating cooling medium, a distributing-chamber at the top of each main chamber, pipes connecting the distributing-chambers and leading through the main chambers, deflecting and distributing devices in each distributing-chamber, an inlet to the upper distributing-chamber in which the gas and weak liquid is initially mixed, and a discharge from the lower series of pipes, whereby the liquid and gas are constantly in contact while passing through the absorber, substantially as described.

2. An absorber, comprising a series of superposed main chambers, each having a suitable inlet and outlet for a circulating cooling medium, a chamber located at the top of the absorber and provided with a common gas and liquid inlet, a discharge-chamber at the bottom, a distributing-chamber above each main chamber, the upper distributing-chamber receiving the overflow from the inlet-chamber, a series of pipes connecting the distributing-chambers, deflecting devices in the distributing-chambers, whereby the gas and liquid are constantly in contact while passing through the absorber, and pipes connecting the lower distributing-chamber with the discharge-chamber, substantially as described.

3. In an apparatus of the kind described, the combination with the main chamber, and the distributing-chamber above it, of the pipes extending from the distributing-chamber through the main chamber, and the serrated deflectors projecting above the pipe-tops into the distributing-chamber, substantially as described.

4. In an apparatus of the kind described, the combination with the main chamber and the distributing-chamber above it, of the pipes extending from the distributing-chamber through the main chamber, said pipes having serrated deflectors at their upper ends, a perforated baffle-plate or deflector extending transversely across the distributing-chamber, and an inlet to the distributing-chamber above the said deflector, substantially as described.

5. An absorber of the kind described, comprising a series of connected superposed chambers having a receiving or inlet chamber at the top and a base or discharge chamber at the bottom, a suitable inlet and outlet to each of the main chambers, a distributing-chamber at the top of each main chamber, a perforated baffle-plate extending transversely through each distributing-chamber, and pipes extending from each distributing-chamber downward through the next main chamber, said pipes having at their upper ends serrated deflectors projecting upward into the distributing-chamber, substantially as described.

WILLIAM M. MIXER.

Witnesses:
WALLACE A. DOWNS,
BERTHA DEYO.